United States Patent [19]

Adams

[11] Patent Number: 4,502,726
[45] Date of Patent: Mar. 5, 1985

[54] CONTROL APPARATUS FOR PIVOTAL-SLIDING ROOF PANEL ASSEMBLY

[75] Inventor: Allan J. Adams, Lincoln Park, Mich.

[73] Assignee: ASC Incorporated, Southgate, Mich.

[21] Appl. No.: 424,071

[22] Filed: Sep. 27, 1982

[51] Int. Cl.³ ................... B60J 7/04; H01H 47/02
[52] U.S. Cl. .................... 296/221; 296/223; 49/30; 307/10 R; 361/179
[58] Field of Search .................. 296/216, 221–223; 307/10 R; 361/179, 194; 49/29, 30

[56] References Cited

U.S. PATENT DOCUMENTS 3,829,155  8/1974  Lutz .................... 296/221
4,379,586  4/1983  Kaltz et al. ............ 296/222
4,420,185 12/1983  Bienert et al. .......... 296/223

FOREIGN PATENT DOCUMENTS 2077461 12/1981 United Kingdom ........ 296/221

Primary Examiner—David A. Scherbel
Assistant Examiner—Dennis H. Pedder
Attorney, Agent, or Firm—Basile, Weintraub & Hanlon

[57] ABSTRACT

A control apparatus for a pivotal/sliding roof panel powered by a reversible electric drive motor operative to move a roof panel from a closed position in a roof opening in a vehicle to either of a venting or an open position. The control apparatus includes a first, operable switch which connects electrical power in one of two opposite polarities to the electric drive motor. A sensor detects when the roof panel is in the closed position. A control device, energizable by the activation of the first switch and the output of the sensor when the roof panel reaches the closed position from either of the venting or open positions, switches its output to disconnect the drive motor from the source of electric power. A switchable member, responsive to the sequential de-activation and re-activation of the first switch, momentarily energizes the control device to connect the drive motor to the source of electrical power in order to initially move the roof panel from the closed position to either of the venting or open positions.

6 Claims, 9 Drawing Figures

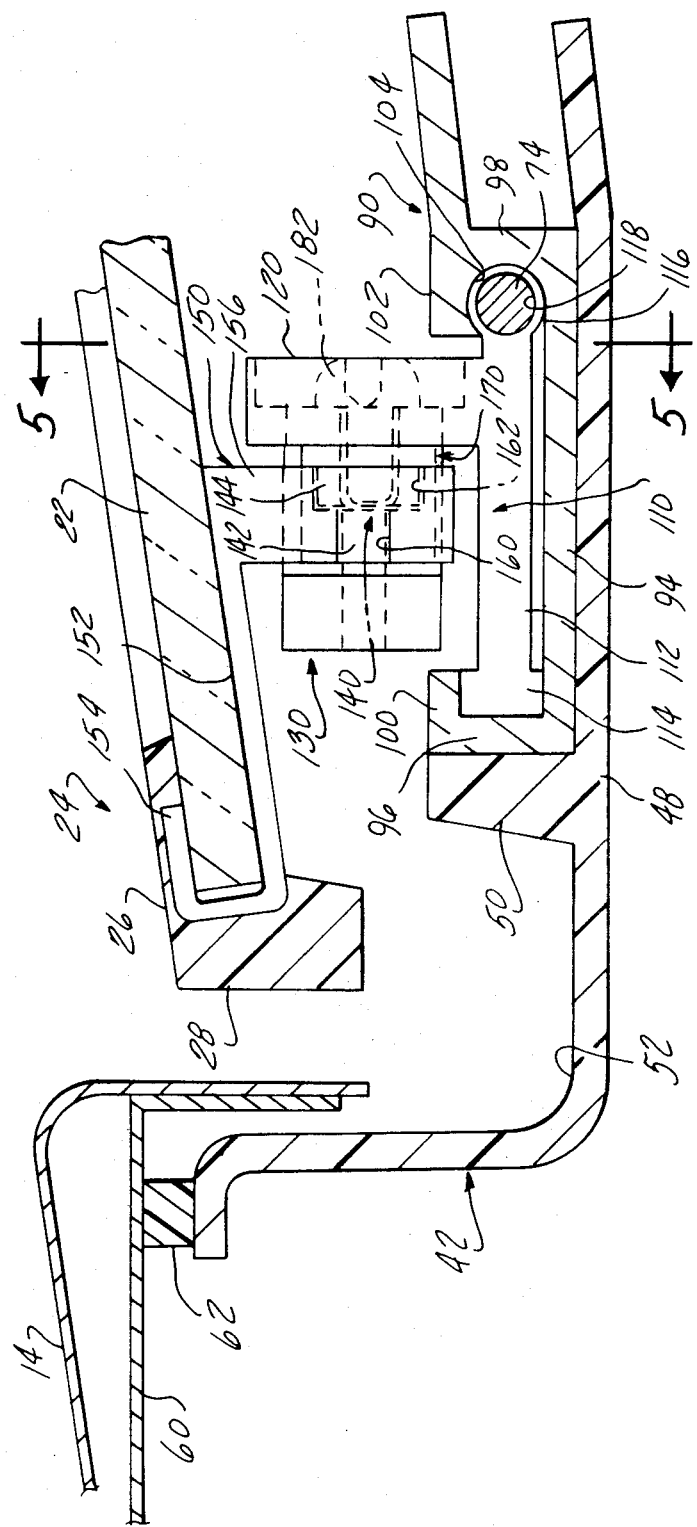

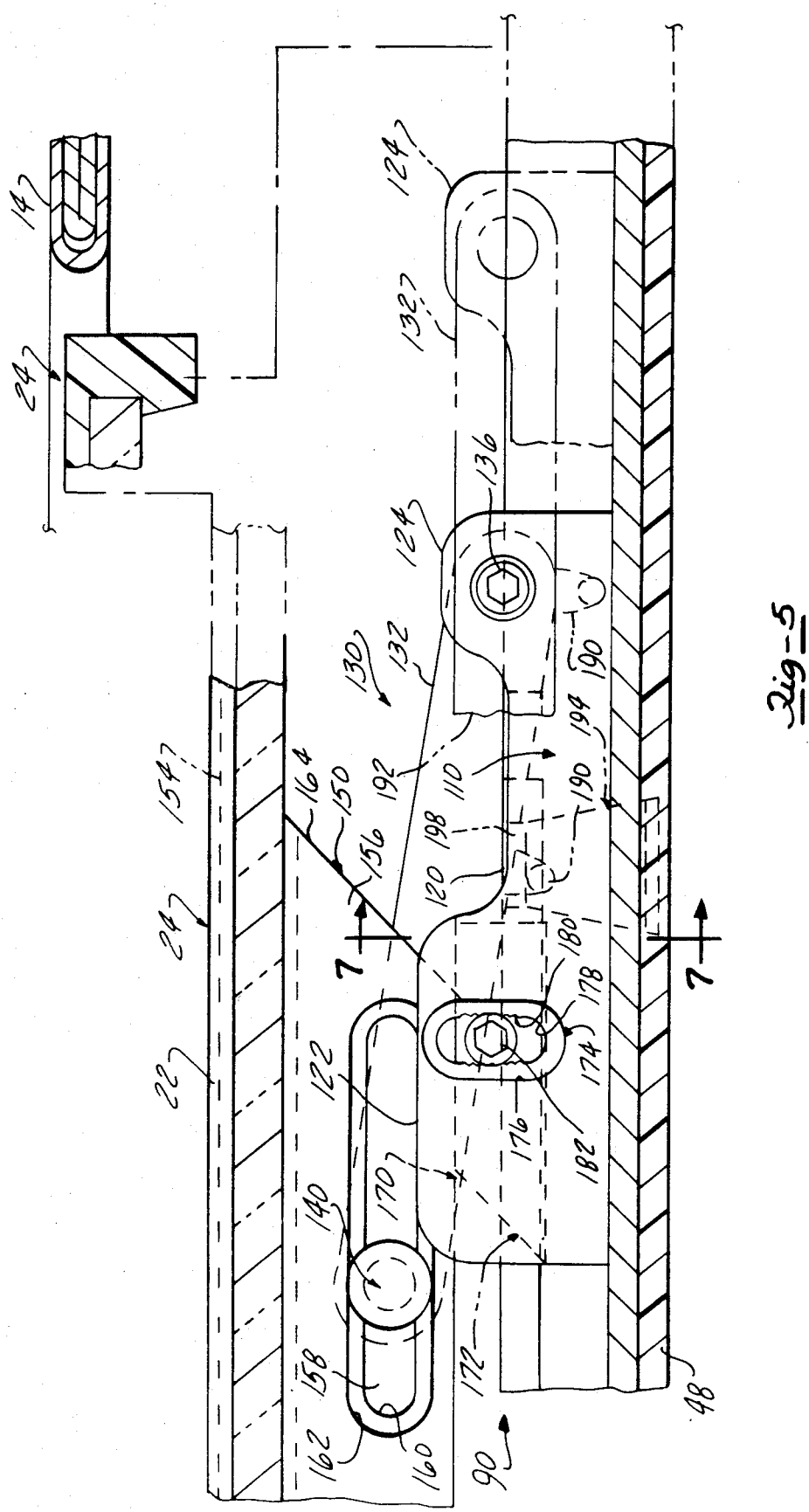

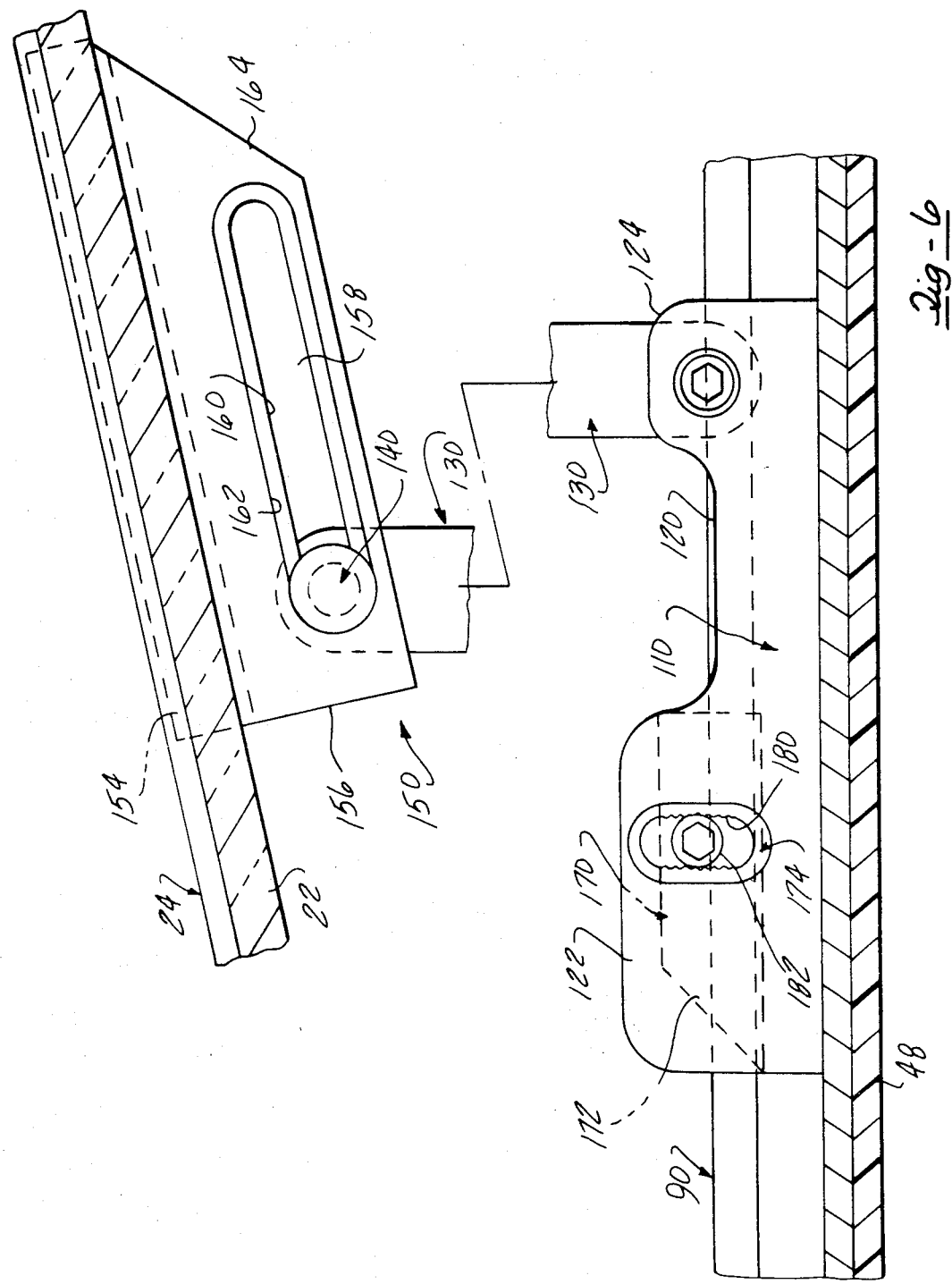

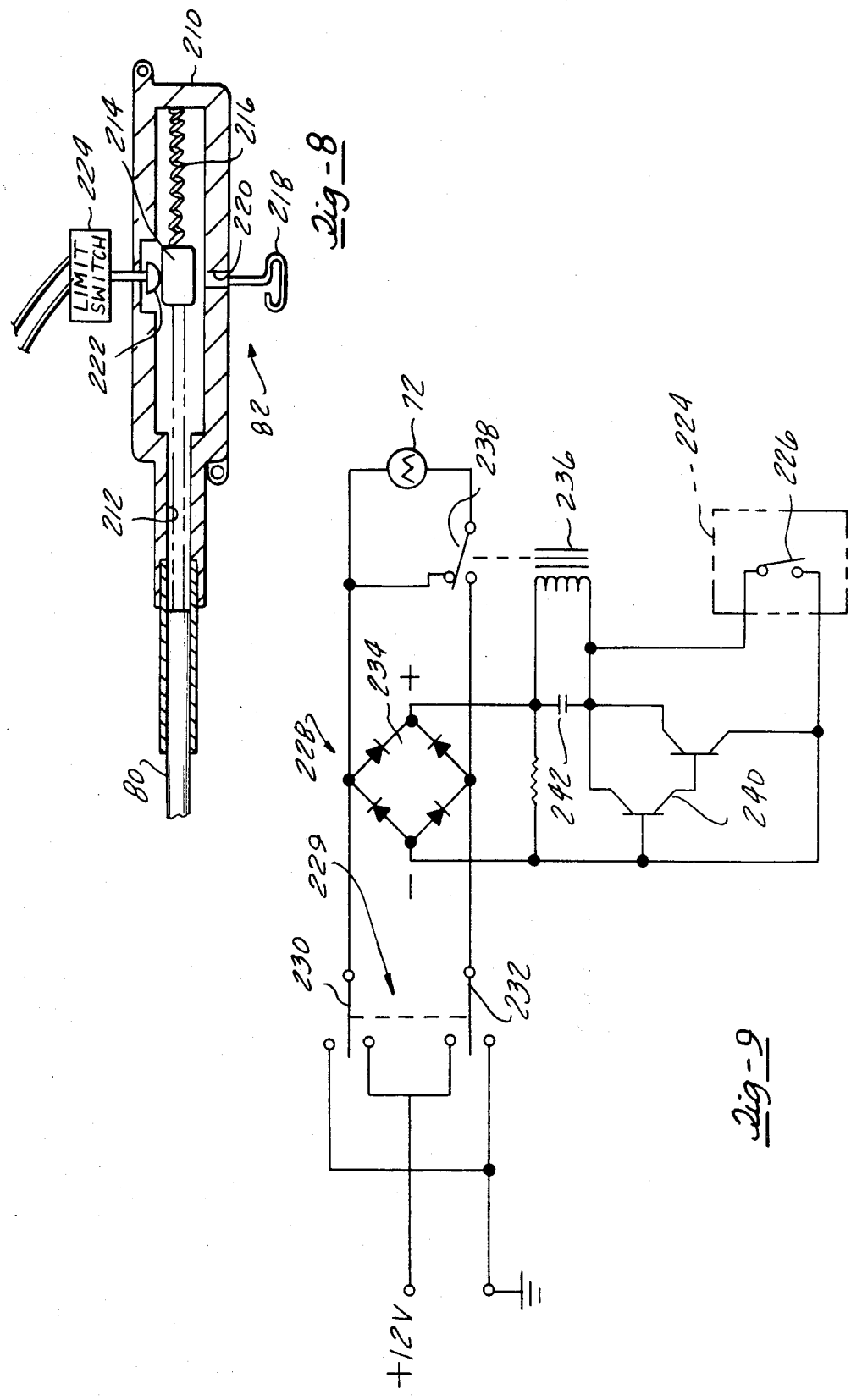

4,502,726

CONTROL APPARATUS FOR PIVOTAL-SLIDING ROOF PANEL ASSEMBLY

BACKGROUND OF THE INVENTION

1. Field of the Invention

This invention relates, in general, to vehicle roof structures and, more specifically, to control apparatus for controlling the movement of a movable roof panel between a closed and a pivoted vent position and between a closed and a lowered, retracted or open position.

2. Description of the Prior Art

Vehicles having a movable, sliding roof panel are well known. Such roof panels are movable between a closed position in which the roof panel sealingly closes an opening in the roof vehicle and an open position in which the roof panel is retracted beneath the vehicle roof structure to open the vehicle interior. It is also known to provide such movable roof panels with the capability to be pivoted about a front edge so as to be partially raised to a flip-up venting position in which the rear edge of the roof panel is raised a short distance above the stationary roof of the vehicle.

A lifter mechanism attached to guide shoes slidingly disposed in guide rails mounted in the vehicle roof structure effects movement of the roof panel between the closed, venting and retracted positions. An electrically powered drive assembly including a reversible electric drive motor causes bi-directional translation of thrust transmitting drive cables attached to the guide shoes for moving the guide shoes and lifter mechanism fore and aft along the guide rails. At appropriate points during such movement, the lifter mechanism operates to raise the rear edge of the roof panel from the closed to the vent position or to lower the rear edge of the roof panel such that it can be retracted under the stationary roof structure of the vehicle.

Electrical controls including vehicle operator control push buttons and a roof panel position indicator switch have been employed to energize the drive motor to move the roof panel in the desired direction and to insure a complete stop of the roof panel in the fully closed position. In such pivotal-sliding roof panel assemblies, it is essential that the roof panel be brought into a fully closed position in order to completely seal the roof opening. Thus, previously devised control circuits for pivotal-sliding roof panel assemblies have been constructed to automatically de-energize the electric drive motor when the roof panel reaches the fully closed position from either of the vent or the open positions.

It has also been known to provide two operator control push buttons for fore/aft movement of the roof panel in which continued movement of the guide shoes in the forward direction after the roof panel has reached a closed position causes the lifter mechanism to raise the rear edge of the roof panel upward to the venting position. The control circuit in such a roof panel assembly is provided with a time delay after the roof panel has reached the fully closed position in order to provide sufficient time for the operator to release the push buttons without causing additional undesired movement of the roof panel out of the fully closed position.

Such previously devised control circuits for pivotal-sliding roof panels assemblies, while effective in precisely controlling movement of the roof panel, either require two sets of control push buttons for moving the roof panel from the closed to the vent position and from the closed to the open position or a single set of push buttons and timer circuitry to insure that the roof panel is brought to a complete stop in the fully closed position. Such additional push buttons and/or timer circuitry undesirably adds to the expense of the roof panel assembly and introduces additional components into the control circuitry which could adversely effect the reliability of the roof panel assembly.

Thus, it would be desirable to provide a control apparatus for a pivotal/sliding roof panel assembly which functions to precisely control the movement of the roof panel between a closed position and either of a vent or open position. It would also be desirable to provide a control apparatus for a pivotal/sliding roof panel assembly which is constructed with a minimal number of components for a reduced manufacturing costs and increased reliability. Finally, it will be desirable to provide a control apparatus for a pivotal/sliding roof panel assembly which effects movement of the roof panel with only two, bi-directional operator switches or push buttons.

SUMMARY OF THE INVENTION

There is disclosed herein a unique control apparatus for a pivotal/sliding roof panel assembly which is powered by a reversible electric drive motor for moving a roof panel between closed, vent and open positions in a opening formed in a roof of a vehicle. The control apparatus includes a first manually operable switch means which is adapted to be connected to a source of electrical power and functions to connect electrical power in first and second opposite polarities to the electric drive motor. A sensor means is provided for sensing when the roof panel is in the fully closed position in the roof opening of the vehicle.

The control apparatus further includes means responsive to the sensor means, for disconnecting the drive motor from the source of electrical power when the roof panel reaches the closed position from either of the vent or open positions. Finally, means are provided which are responsive to the sequential de-activation and re-activation of the first switch means for momentarily connecting the drive motor to the source of electrical power in order to initially cause the roof panel to move from the closed position to either of the vent or open positions.

In a preferred embodiment, the means for disconnecting the drive motor from the source of electrical power when the roof panel reaches the closed position includes a switchable contact controlled by the sensor means which switches between two distinct states when the roof panel reaches the closed position and a control means, such as an electrical relay, which is responsive to the activation of the first switch means and one state of the sensor means output. The control means provides an output which is switchable between a first state corresponding to the roof panel being in the closed position and a second state corresponding to the roof panel being away from the closed position. The control means output is connected between the electrical drive motor and the source of electrical power so as to disconnect the drive motor from the source of electrical power when the roof panel reaches the closed position. Further, the second state of the control means output is connected across the drive motor so as to short out the drive motor when the roof panel reaches the closed positon in order to instantaneously brake the drive motor to a complete stop and thereby prevent coasting or undesirable additional movement of the roof panel from the closed position.

Finally, the means for momentarily re-connecting the drive motor to the source of electrical power so as to move the roof panel from the closed position includes a switch means which is energizeable by the sequential de-activation and re-activation of the first switch means and which includes an output which switches from an open to a closed state. The output of the switch means is connected in parallel with the output of the sensor means so as to momentarily energize the control relay and thereby momentarily connect the drive motor to the source of electrical power for initially moving the roof panel from the closed position. A timer means is provided for de-energizing the switch means a predetermined amount of time after the switch means has been energized. At this time, the sensor means output will have switched back to the closed position to maintain the control relay in the energized state so as to continually energize the drive motor for further movement of the roof panel in the desired direction.

The control apparatus of the present invention is uniquely constructed to instantaneously deenergize the drive motor when the roof panel reaches a closed position so as to prevent further, undesirable movement of the roof panel beyond the closed position. Further, the control apparatus is constructed with a circuit for momentarily re-energizing the drive motor in order to move the roof panel from the closed position which enables a single pair of operator controlled forward and reverse direction switches or push buttons to be employed to move the roof panel between the closed, vent and open positions. This simplifies the construction of the control apparatus, reduces manufacturing costs and improves reliability due to the minimal number of components required.

BRIEF DESCRIPTION OF THE DRAWING

The various features, advantages and other uses of the present invention will become more apparent by referring to the following detailed description and drawing in which:

FIG. 3 is a cross sectional view, generally taken along 3—3 in FIG. 1, showing the construction of the lifter apparatus of the present invention;

FIG. 4 is a perspective view of the lifter apparatus of the present invention depicted in the lowered position;

FIG. 5 is a cross sectional view, generally taken along line 5—5 in FIG. 3, showing the position of the components of the lifter apparatus when the roof panel is in the closed position;

FIG. 6 is a cross sectional view, similar to that depicted in FIG. 5, but showing the position of the components of the lifter apparatus when the roof panel is in the vent position;

FIG. 7 is a cross sectional view, generally taken along line 7—7 in FIG. 5;

FIG. 8 is a cross sectional view of the roof panel position sensor; and

FIG. 9 is a schematic diagram of the control apparatus used to control movement of the roof panel.

DESCRIPTION OF THE PREFERRED EMBODIMENTS

Figure 1:
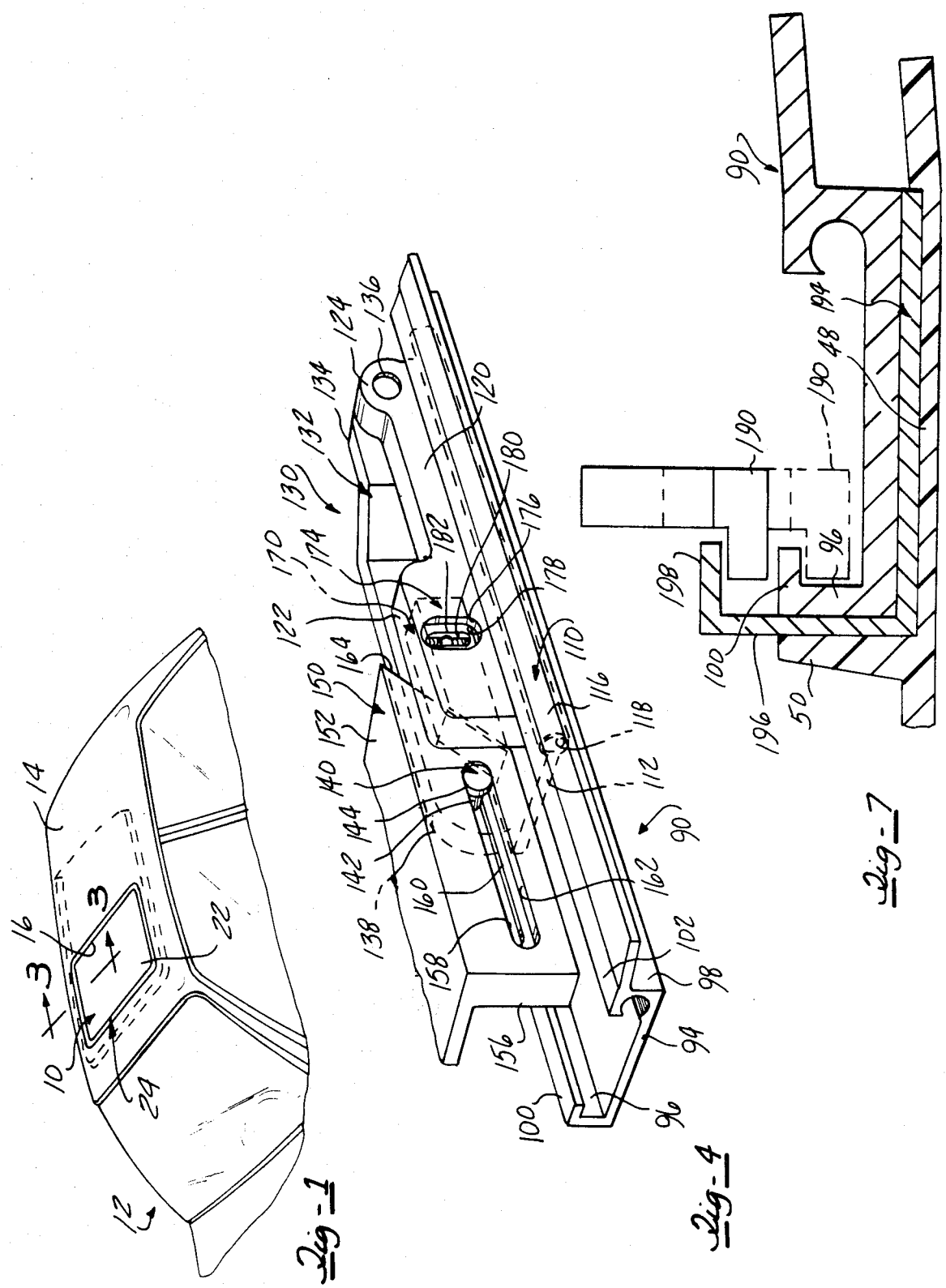
FIG. 1 is a partial, perspective view of a vehicle having a pivotal-sliding roof panel assembly mounted therein which includes a lifter apparatus constructed in accordance with the teachings of the present invention.

Throughout the following description and drawing, identical reference numbers are used to refer to the same component shown in multiple figures of the drawing.

Referring now to the drawing, and to FIG. 1 in particular, there is illustrated a pivotal-sliding roof panel assembly 10 which is adapted to be mounted on the roof of a vehicle 12. The vehicle 12 includes a stationary roof structure 14 having an opening 16 formed therein. Preferably, the opening 16 has a rectangular configuration and is situated over the front seat of the vehicle 12. The roof opening 16 is opened and closed by a movable roof panel 22 which slides between closed and open positions as well as pivoting about a front edge to a flip-up, vent position.

As shown in FIGS. 3, 5 and 6, the pivotal-sliding roof panel assembly 10 includes a rectangularly shaped roof panel 22 which is preferably formed of a transparent glass. The roof panel 22 has approximately the same shape as the roof opening 16 so as to completely close the opening 16 when the roof panel 22 is moved to the fully closed position. A casing or gasket 24 formed of a plastic material, such as a polyvinyl chloride, is molded around the peripheral edge of the roof panel 22.

The casing 24 is formed with an upper lip 26 which is in registry with the peripheral edge of the upper surface of the roof panel 22 and a downwardly extending flange portion 28 which depends from the upper lip 26 along the side of the roof panel 22 and is in registry with the bottom surface of the roof panel 22. Suitable attachment members, which will be described in greater detail hereafter, are integrally molded between the casing 24 and the roof panel 22 to provide a means for mounting the roof panel 22 on the vehicle 12.

Figure 2:
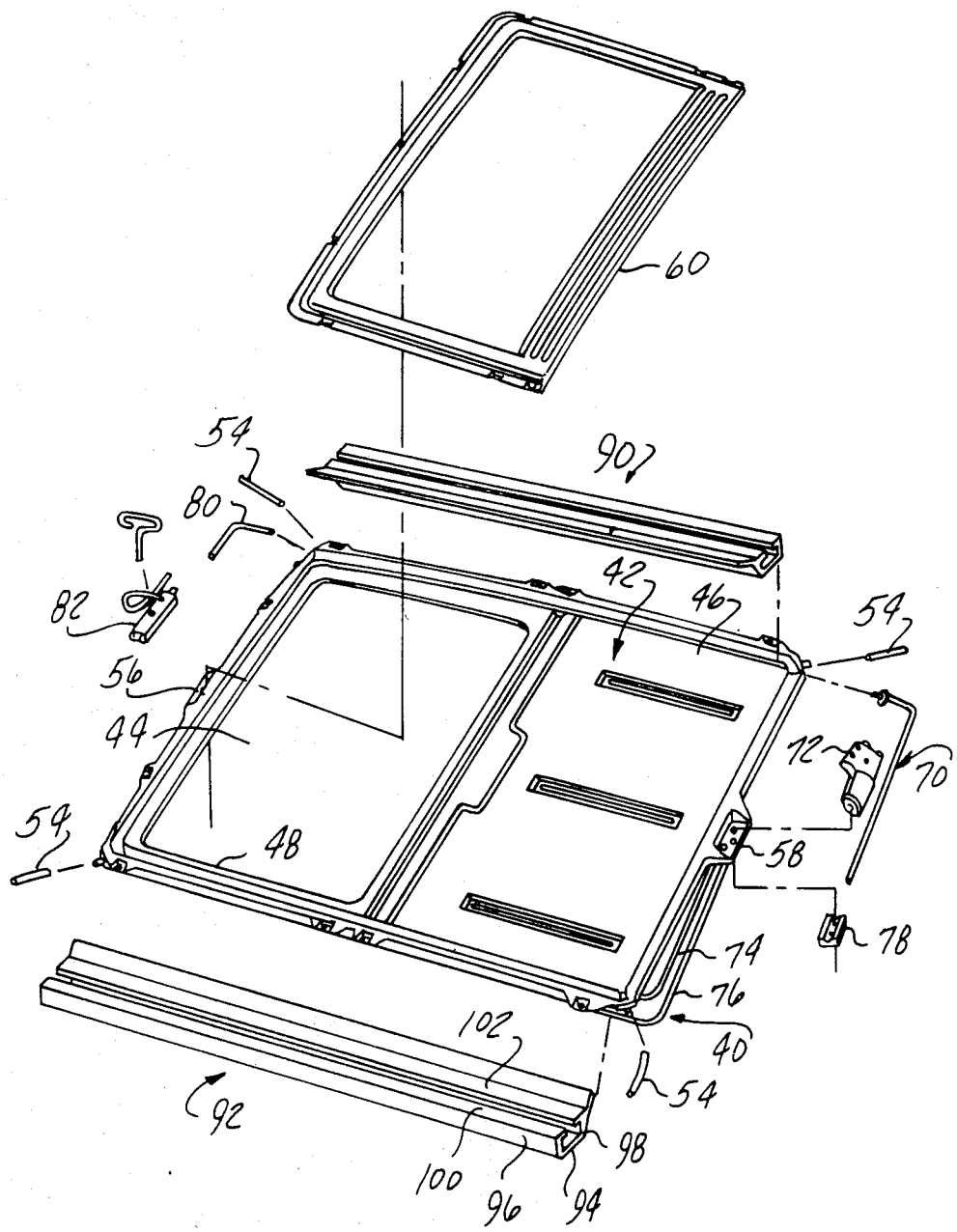
FIG. 2 is an exploded, perspective view of the housing of the roof panel apparatus.

Referring now to FIG. 2, there is depicted a frame or housing assembly 40 which is adapted to be mounted to the interior of the stationary roof structure 14 of the vehicle 12. The frame assembly 40 includes an integral formed, substantially rectangular housing 42. The housing 42 includes an aperture 44 which is configured to the approximate shape of the roof opening 16 and a planar, solid rear section 46.

Preferably, the housing 42 is formed as an integral unit from a stamped, lightweight material, such as fiberglass sheet molding compound (CSMC). Other materials, such as nylon or polypropylene based compounds, having the requisite high strength and lightweight properties, may also be used to form the housing 42.

The housing 42 is integrally formed with mounting brackets, drain openings and stiffening ribs. The housing 42 also includes opposed side flanges 48 which extend longitudinally along the sides of the housing 42. An intermediate, upwardly extending flange 50 is formed on each side flange 48 of the housing 42 and divides the flange 48 into an inner portion which serves as a base for the guide rails, to be described in greater detail hereafter, and an outer channel or drain 52. Each of the side drain troughs 52 communicates with like formed drain troughs situated along the front and rear edges of the housing 42. The corners of the housing 42 are formed with hollow conduits 54 which are adapted to be connected to suitable conduits or tubes which extend through the body of the vehicle 12 to form means for diverting water collected in the drain troughs of the housing 42 away from the roof panel assembly 10.

The housing 42 also includes front and rear mounting pads 56 and 58, respectively. The mounting pads 56 and 58 serve as a means for mounting the drive means, described hereafter, on the housing 42. This enables the drive means to be selectively mounted on either of the front or rear edges of the housing 42 depending upon the particular vehicle construction.

As shown in FIGS. 2 and 3, the housing 42 is adapted to be mounted to a panel opening reinforcement 60 which is of substantially rectangular configuration. The panel opening reinforcement 60 is formed of a metallic material, such as steel, and is secured to the interior stationary roof structure 14 of the vehicle 12 by suitable means, such as by welding. A resilient padding member 62 is interposed between the outer edges of the housing 42 and the panel opening reinforcement 60. The housing 42 is then secured by conventional fasteners to the panel opening reinforcement 60 so as to mount the housing 42 to the stationary roof structure 14 of the vehicle 12.

Drive means 70 are provided for moving the roof panel 22 between open and closed positions as well as between the closed and vent positions. As is conventional, the drive means 70 includes a reversible, electric, drive motor 72 which has an output shaft connected to an output gear assembly mounted on either of the front or rear mounting pads 56 and 58 such that the bevel gear extends downwards through an aperture in the mounting pads 56 and 58.

The roof panel 22 is driven by the drive motor 72 and gear assembly via thrust transmitting drive cables 74 and 76 which have one end secured to rear guide shoes, described hereafter. The drive cables 74 and 76 have a helically wound outer surface adpated to engage the bevel gear of the drive means 70. As the bevel gear rotates, the cables 74 and 76 are linearly moved resulting in movement of the roof panel 22 between its open and closed positions. A guide block 78 is mounted on the bottom sides of each of the front and rear mounting pads 56 and 58 and includes a pair of longitudinally-extending slots therein which are adapted to slidingly receive the thrust transmitting drive cables 74 and 76. A perpendicularly oriented bore extends through the guide block 78 centrally between the longitudinally extending slots and receives the bevel gear therein such that the bevel gear engages the sides of the drive cables 74 and 76 to cause translation thereof.

In a rear mounted drive motor configuration, such as that depicted in FIG. 2, an idler cable 80 is attached at one end to one of the front guide shoes of the roof panel assembly 10. The other end of the idler cable 80 enters the housing of a sensor means 82 and engages an actuator disposed therein, as described in greater detail hereafter.

As shown in FIGS. 2–7, a pair of elongated guide tracks or rails 90 and 92 are mounted on the inwardly extending side flanges 48 of the housing 42 and extend in the sliding direction of the movable roof panel 22. The guide rails 90 and 92 are identically constructed and include a base 94, upwardly extending spaced side walls 96 and 98 and inwardly extending flanges 100 and 102. The guide rails 90 and 92 have a channular configuration and are adpated to slidingly receive the guide shoes connected to the movable roof panel 22. The juncture between the base 94 and one of the side walls, such as side wall 98, of each guide rail 90 and 92 is formed with a circular recess 104.

As is conventional, the roof panel assembly 10 is provided with front and rear pairs of guide shoes which control the fore and aft sliding movement of the roof panel 22. The front guide shoes, not shown, comprise pivotal links which are connected on opposed sides of the roof panel 22 adjacent the front edge thereof. The front guide shoes enable the roof panel 22 to be pivoted such that the rear edge of the roof panel 22 can be lowered and slid rearward underneath the stationary roof structure 14 of the vehicle 12, raised to a closed position wherein the roof panel 22 is substantially in registry with the edges of the roof opening 16 and pivoted about the front edge to a partially raised, vent position.

As shown in FIGS. 4–7, each of the identical rear guide shoes 110 are formed with a planar base 112 having outwardly extending side flanges 114 and 116. One of the side flanges 114 has a substantially square configuration and is adapted to ride between the base 94 and the upper flange 100 of the guide rail. The opposed side flange 116 has a circular cross section which slides within the circular recess 104 in the guide rail and is formed with a hollow bore 118 extending therethrough which is adapted to securely receive one of the thrust transmitting drive cables 74 or 76. In this manner, translation of the drive cables 74 and 76 causes movement of each of the rear guide shoes 110 longitudinally within the guide rails 90 and 92.

Each of the rear guide shoes 110 further includes a centrally located, upwardly extending flange 120 having first and second raised bosses 122 and 124, respectively, formed at opposite ends thereof.

According to the teachings of the present invention, a lifter apparatus, denoted in general by reference number 130 in FIG. 4, is provided for raising the roof panel 22 between lowered, closed and vent positions. The lifter apparatus 130 includes a link 132, a cam or wedge block 170, and a panel attachment member 150.

The link 132 is in the form of an elongated member having spaced, laterally offset, first and second ends 134 and 138, respectively. The first end 134 of the link 132 is pivotally connected to the rear guide shoe 110 by means of a pivot pin 136 which extends through aligned bores formed in the boss 124 of the rear guide shoe 110 and the first end 134 of the link 132. The second end 138 of the link 132 is thus disposed for pivotal movement about the first end 134.

A slider member 140 is attached to the second end 138 of the link 132. The slider member 140 comprises an elongated shaft having a first reduced diameter portion 142 and an outer enlarged head 144.

The panel attachment member 150 is in the form of a bracket having a planar upper surface 152. The outermost end 154 of the panel attachment member 150 is bent inward and spaced above the planar top surface 152. The opposed, spaced surfaces of the outermost end 154 and the planar top surface 152 of the panel attachment member 150 are adapted to engage the edges of the top and bottom surfaces of the roof panel 22. Preferably, the outermost edge portions of the panel attachment member 150 are mounted on the roof panel 22 by integrally molding the outermost edges of the panel attachment member 150 within the casing or gasket 24, as shown in FIG. 3.

The panel attachment member 150 further includes a depending flange portion 156 having an aperture 158 formed therein. Preferably, the aperture 158 is in the form of an elongated slot having a first smaller width section 160 and and a larger width outer section 162. The first and second portions 160 and 162 of the aperture 158 correspond in size to the first and second portions 142 and 144, respectively, of the slider member 140 attached to the second end 138 of the link 132. The aperture 158 slidingly receives the slider member 140 therein such the slider member 140 is slidable along the length of the aperture 158 during movement of the lifter apparatus 130 of the present invention, as will be described in greater detail hereafter. The depending flange portion 156 of the panel attachment member 150 is further provided with a first cam surface 164, adjacent one end thereof. The cam surface 164 has a planar, vertically extending, inclined form.

As shown in FIGS. 3, 5 and 6, the lifter apparatus 130 includes a cam or wedge block 170. The cam block 170 has a generally cubical configuration and is formed with a cam surface 172 which is shaped complimentary to the cam surface 164 formed on the panel attachment member 150. Thus, the cam surface 172 on the cam block 170 has a planar, vertically extending, inclined form.

The cam block 170 is mounted on the first boss 122 on the rear guide shoe 110. According to a preferred embodiment, the cam block 170 is adjustably mounted in a vertical direction to the rear guide shoe 110 so as to enable the vertical position of the roof panel 22 to be adjusted to ensure a fully closed, water and air tight seal between the roof panel 22 and the peripheral edges of the roof opening 16 when the roof panel 22 is in the closed position.

A vertically extending, elongated slot 174 is formed in the first boss 122 on the rear guide shoe 110 and has a first enlarged width section 176 and a second, reduced width section 178. A plurality of serrations 180 are formed on the vertically extending sides of the reduced width section 178 of the slot 174 and correspond to serrations formed in a vertical slot on the cam block 170. In this manner, the cam block 170 may be adjusted vertically to align the serrations thereon with selected serrations in the slot 174 on the first boss 122 so as to vary the vertical position of the cam block 170 with respect to the rear guide shoe 110. A suitable fastening means 182, such as a shoulder screw, is inserted through the aligned slots in the first boss 122 and the cam block 170 to securely mount the cam block 170 to the rear guide shoe 110 in the desired vertical position.

In describing the operation of the lifter mechanism 130 of the present invention in moving the roof panel 22 between lowered, closed and vent positions, it will be assumed that the lifer mechanism 130 is initially disposed in the position depicted in FIGS. 3 and 4 which corresponds to the lowered position of the roof panel 22 in which the roof panel 22 is disposed beneath the stationary roof structure 14 of the vehicle 12.

When the drive means 70 has been energized to move the roof panel 22 from the open to the closed positions, the thrust transmitting drive cables 74 and 76 will push the rear guide shoes 110 forward along the guide tracks 90 and 92. As the link 132 is in a substantially horizontal orientation, with the pivot pin 136 and the slider 140 aligned along the same horizontal plane and the complimentary cam surfaces 164 and 172 of the panel attachment member 150 and the cam block 170, respectively, are in abutting relationship, the entire roof panel 22 will be slid towards the front of the vehicle 12 upon forward movement of the rear guide shoes 110 until the front guide shoes engage stops mounted on the housing 42 not shown, which terminate further forward movement of the roof panel 22. At this point, the drive means 70 continues to urge the rear guide shoes 110 in a forward direction such that the cam surface 164 on the panel attachment member 150 will slide upwards along the mating cam surface 172 of the cam block 170 and urge the rear edge of the roof panel 22 upward and pivot the link 132 about the first end 134 until the cam block 170 slides completely underneath the lower surface of the depending flange portion 156 of the panel attachment member 150 is shown in FIG. 5. At this position, the roof panel 22 has been raised into registry with the edges of the roof opening 16 of the vehicle 12.

If it is desired to move the roof panel 22 to the vent position, shown in FIG. 6, the drive means 70 will be energized to urge the rear guide shoes 110 in a further forward direction. However, as forward movement of the front edge of the roof panel 22 is prevented, continued forward movement of the rear guide shoes 110 will pull the first end of the link 134 horizontally forward causing the second end 138 of the link 132 to pivot upwards in a clockwise direction, as viewed in FIGS. 5 and 6, until the link 130 has assumed a substantially vertical position, as shown in FIG. 6, which corresponds to the vent position of the roof panel 22. In this position, the rear edge of the roof panel 22 is raised a short distance above the stationary roof structure 14 of the vehicle 12.

Reversal of the drive means 70 will reverse the above-described operation of the lifter apparatus 130 and cause lowering of the roof panel 22 from the vent to the closed position or from the closed to the lowered position wherein it can be slid aft under the stationary roof structure 14 of the vehicle 12.

Additional features of the lifter apparatus of the present invention are illustrated in FIGS. 5 and 7. According to another embodiment of the present invention, means are provided for preventing premature and inadvertent raising of the roof panel 22 as it is being moved from the open to the closed position. The means for preventing such premature raising of the roof panel 22 includes an outwardly extending projection 190 formed on an intermediate portion of the link 132. As shown in phantom in FIG. 5, the projection 190 is positioned so as to ride beneath the upper flange 100 of the guide rail 90. A discontinuity or opening 192 is formed in the upper flange 100 of the guide rail 90 at a location where the roof panel 22 can begin to be urged upward to the closed position. In this manner, the projection 190 is held beneath the upper flange 100 until the roof panel 20 can rise to the closed position. At this point, as the link 130 pivots about the first end, as described above, to raise the roof panel 22 to the closed position, the projection 190 will pass through the discontinuity 192 in the upper flange 100 of the guide rail 90 so as to permit upward movement of the link 132 and roof panel 22.

The projection 190 also serves as a means for preventing undesired romoval of the roof panel 22 from the roof opening 16 when the roof panel 22 is in the closed position. An L-shaped member or bracket 194 is mounted between the side flange 48 of the panel housing 40 and the guide rail 90 and includes an upwardly extending side wall 196 and an inwardly extending upper flange 198.

As shown in FIG. 7, the upper flange 198 of the bracket 194 is spaced above the upper flange 100 of the guide rail 90. Further, the bracket 194 is located on the guide rail 90 such that the projection 190 is disposed beneath the upper flange 198 when the roof panel 22 has been moved to the closed position. Thus, it can be seen that the upper flange 198 prevents upward movement of the roof panel 22 such as would result when the roof panel 22 is attempted to be removed from the roof opening 16 from the exterior of the vehicle 12.

During movement of the roof panel 22 from the closed to the vent position, the guide shoes 110 will initially translate towards the front of the vehicle 12 such that the projection 190 will pass from the underneath the upper flange 198 of the bracket 194 and be free to move upward as the link 130 pivots to the vent position.

As noted above, the pivotal-sliding roof panel apparatus 10 of the present invention is provided with sensor means 82 which operates to sense when the roof panel 22 is in the closed position. The sensor means 82, shown in FIG. 2, and in greater detail in FIG. 8; comprises a housing 210 which is hollow and is formed with an outwardly extending hollow tube 212 which is adapted to slidably receive the end of one of the drive cables, such as drive cable 74. In a rear mounted drive motor configuration, the idler cable 80 is connected to the end of the guide cable 74 and acts as an extension of the drive cable 74 for activating the sensor means 82.

The end of the idler cable 80, is slidingly receivable within the interior of the housing 210 and contacts an actuator 214 which is movably disposed within the housing 210. The actuator 214 is biased to a central location within the interior of the housing 210 by suitable biasing means, such as an elongated coil spring 216.

The housing 210 is positioned on the frame 40 such that the end of the idler cable 80 will contact the actuator 214 at the central or neutral position when the roof panel 22 is in the closed position. An arming pin 218 is removably inserted through a bore 220 formed in a side of the housing 210 to engage and contact the actuator 214 and hold it in the central neutral position until the housing 210 is properly positioned on the frame 40 and the end of the idler cable 80 is in contact with the actuator 214.

When in the central, or neutral position, the actuator 214 engages a movable plunger 222 which is connected to a conventional electrical limit switch 224. Depression of the plunger 222 by the actuator 214 causes the output contact 226 of the limit switch 224, FIG. 9, to switch from a normally closed position to an open position.

When the roof panel 22 has moved from the closed position to either of the vent or open positions, the actuator 214 will be moved by the idler cable 80 or the bias spring 216 away from the central or neutral position such that the plunger 222 of the limit switch 224 extends outward therefrom which results in the output contact 226 of the limit switch 224 switching back to the normally closed state.

As shown in FIG. 9, the output contact 226 of the limit switch 224 forms a part of a control apparatus 228 which functions to control the movement of the roof panel 22 between the open, closed and vent positions. The control apparatus 228 is preferably mounted within a module located within the vehicle 12 and is connected to a suitable source of electrical power, such as the 12 V power provided by the vehicle battery.

In a preferred embodiment of the present invention, the control apparatus 228 includes a manually operable switch means 229 having first and second contacts 230 and 232, respectively, which are connected between the source of electrical power and to the drive motor 72. Contacts 230 and 232 are switchable between two distinct states corresponding to forward and rearward movement of the roof panel 22 and operate to connect electrical power in one of two opposite polarities to the drive motor 72 in order to control the direction of rotation of the output shaft of the drive motor 72. Preferably, the switch means 229 comprises a double pole double throw switch in which the contacts 230 and 232 are ganged together and are normally biased to a neutral or center position, as shown in FIG. 9.

The control apparatus 228 further includes a conventional rectifying bridge circuit 234 which supplies power to the logic elements used in the control apparatus 228 of the present invention.

Means, responsive to the sensor means 224, are provided for disconnecting the drive motor 72 from the source of electrical power when the roof panel 22 reaches the closed position from either of the vent or open positions. Preferably, the disconnecting means includes a first control means 236, such as an electromechanical relay, which has its coil connected to the source of electrical power through the first switch means 229 and the output contact 226 of the sensor means 224. The control means or relay coil 236 includes a switchable contact 238 when the relay coil 236 is energized upon activation of the first switch means 229 and the roof panel 22 is positioned away from the closed position, the relay coil 236 switches from a first state, shown in FIG. 9, to a second state wherein electrical power is applied therethrough to the drive motor 72 to effect movement of the roof panel 22.

When the roof panel 22 reaches the closed position, the sensor means 214 will depress the plunger 216 and cause contact 226 to switch to the open state, as described above, which breaks the circuit to the relay coil 236, thereby de-energizing the relay coil 236 which causes its output contact 238 to switch to the first state disconnecting electrical power from the drive motor 72. As shown in FIG. 9, in the first state, the relay contact 238 is connected across the output terminals of the drive motor 72 so as to short out the drive motor 72 which causes an instantaneous breaking or stoppage of the drive motor 72 and prevents undesired coasting or additional movement of the roof panel 22 from the closed position.

When the roof panel assembly 20 is in the fully closed position, the contact 226 will be in an open state and the contact 238 of the relay 236 will be in a position shorting out the drive motor 72 such that electrical power is not applied thereto. In order to move the roof panel 22 from the closed position to either of the vent or open positions, the control apparatus 228 is provided with means for momentarily connecting electrical power to the drive motor 72 so as to cause initial movement of the roof panel 22 from the closed position until the sensor 214 disengages from the plunger 216 and output contact 226 again switches to the closed position to maintain the relay coil 236 in an energized state.

The means for momentarily connecting electrical power to the drive motor 72 includes a switch means 240 comprised of two serially connected transistors and a RC timer network comprised of a serially connected resistor and capacitor. The switch means 240 and RC network 242 are responsive to the sequential de-activation and re-activation of the first switch means 229 such that the switch means 240 switches to a closed state thereby connecting power to the relay coil 236 which causes its output contact 238 to switch to a state whereby electrical power is connected to the drive motor 72 to effect initial movement of the roof panel 22 from the closed position. As the output of the switch means 240 is connected in parallel with contact 226, power will be applied to the relay coil 236 despite the contact 226 being in the open state.

As described above, the contact 226 will switch to the closed state shortly after the roof panel 22 moves from closed position so as to continually apply power to the relay coil 236 thereby maintaining it in an energized state such that electrical power is applied through the relay contact 238 to the drive motor 72 to move the roof panel 20 to the vent or open position.

The switch means 240 provides a momentary output which is controlled by the time required to charge the capacitor in the RC network 242. At the completion of this predetermined time period, which is preferably less then one second in duration, the switch means 240 will be de-energized to await the next sequential de-activation and re-activation of the switch means 229.

Thus, there has been disclosed a new and improved lifter apparatus for a movable roof panel which operates to move the roof panel between open, closed and vent positions in the roof opening of a vehicle. The lifter apparatus is compact in size so as to minimize the amount of interior space consumed by the complete roof panel assembly within the interior of the vehicle. A unique control apparatus has also been disclosed which controls the energization of the roof panel drive means to move the roof panel between closed, open or vent positions.

What is claimed is:

1. A control apparatus for a pivotal/sliding roof panel assembly powered by a reversible electric drive motor for movement of roof panel from a closed position to either of a vent or open position in an opening formed in the roof of a vehicle comprising:
   a first, manually operable switch means adapted to be connected to a source of electrical power and to connect electrical power in first and second opposite polarities to the drive motor;
   sensor means for sensing when the roof panel is in the closed position in the roof opening, the sensor means having an output switchable between two distinct states when the roof panel reaches the closed position;
   means, responsive to the sensor means, for disconnecting the drive motor from the source of electrical power when the roof panel reaches the closed position from either of the vent or open positions, the disconnecting means including:
   first control means, responsive to the first switch means and the sensor means output, for providing an output which is switchable between a first state corresponding to the roof panel being in a closed position and a second state corresponding to the roof panel being away from the closed position, the first control means output being disposed to disconnect the drive motor from the source of electrical power when the roof panel reaches the closed position; and
   means, responsive to the sequential de-activation and re-activation of the first switch means, for momentarily bypassing the first control means when the first control means is in the first roof panel closed state and connecting the drive motor to the source of electrical power to move the roof panel from the closed position to either of the vent or open positions until the roof panel has moved from the closed position to switch the first control means to the second state.

2. The control apparatus of claim 1 wherein:
   the first control means output is connected, when in the first state, across the drive motor so as to short out power to the drive motor when the roof panel reaches the closed position.

3. The control apparatus of claim 1 wherein:
   the first control means comprises an electrical relay having an output contact switchable between closed and open states.

4. The control apparatus of claim 1 wherein the first switch means includes first and second contacts, each switchable between two distinct states.

5. A control apparatus for a pivotal/sliding roof panel assembly powered by a reversible electric drive motor for movement of a roof panel from a closed position to either of a vent or open position in an opening formed in the roof of a vehicle comprising:
   a first, manually operable switch means adapted to be connected to a source of electrical power and to connect electrical power in first and second opposite polarities to the drive motor;
   sensor means for sensing when the roof panel is in the closed position in the roof opening, the sensor means having an output switchable between two distinct states when the roof panel reaches the closed position;
   first control means, responsive to the first switch means and the sensor means output, for providing an output which is switchable between a first state corresponding to the roof panel being in a closed position and a second state corresponding to the roof panel being away from the closed position, the first control means output being disposed to disconnect the drive motor from the source of electrical power when the roof panel reaches the closed position;
   means, responsive to the sequential deactivation and re-activation of the first switch means, for momentarily connecting the drive motor to the source of electrical power to move the roof panel from the closed position to either of the vent or open positions, wherein the means for momentarily connecting the drive motor to the source of electrical power comprises:
   second switch means having an output switchable between two distinct states;
   timer means for de-energizing the second switch means a pre-determined period of time after the second switch means has been activated;
   the output of the second switch means being connected in parallel with the sensor means output for momentarily energizing the first control means.

6. A control apparatus for a pivotal/sliding roof panel assembly powered by a reversible electric drive motor for movement of a roof panel from a closed position to either of a vent or open position in an opening formed in the roof of a vehicle comprising:
   a first, manually operable switch means adapted to be connected to a source of electrical power and to connect electrical power in first and second opposite polarities to the electric drive motor;
   sensor means for sensing when the roof panel is in the closed position, the sensor means having an output switchable between a normally closed state to an open state when the roof panel reaches the closed position;

relay means connected to the source of electrical power through the first switch means and the sensor means output and energizable thereby, the relay means including a switchable contact connected between the drive motor and the source of electrical power to disconnect the drive motor from the source of electrical power upon de-energization of the relay means when the roof panel reaches the closed position;

means for momentarily connecting electrical power to the drive motor to move the roof panel from the closed position to either of the vent or open positions, the momentary connecting means including an output connected in parallel with the sensor means output and switchable from an open to a closed state when the momentary connecting means is energized by the sequential de-activation and re-activation of the first switch means to re-energize the relay means when the roof panel reaches the closed position in order to momentarily connect the drive motor to the source of electrical power and move the roof panel from the closed position; and timer means for de-energizing the momentary connecting means a predetermined period of time after the momentary connecting means is initially energized.

* * * * *